(12) United States Patent
Williams et al.

(10) Patent No.: US 10,730,430 B2
(45) Date of Patent: Aug. 4, 2020

(54) SIDEMARKER LIGHT ASSEMBLY AND MOTOR VEHICLE LIGHT ASSEMBLY INCORPORATING THAT SIDEMARKER LIGHT ASSEMBLY

(71) Applicant: FORD GLOBAL TECHNOLOGIES, LLC, Dearborn, MI (US)

(72) Inventors: Bruce Preston Williams, Grosse Pointe Park, MI (US); Gary Edward Henige, Northville, MI (US); Nicholas James Nowicki, Allen Park, MI (US); Timothy Scott Vladu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 15/400,472

(22) Filed: Jan. 6, 2017

(65) Prior Publication Data

US 2018/0194275 A1 Jul. 12, 2018

(51) Int. Cl.
*B60Q 1/32* (2006.01)
*F21S 43/20* (2018.01)
*F21S 43/14* (2018.01)
*F21S 43/237* (2018.01)
*F21S 41/20* (2018.01)
*F21S 43/19* (2018.01)
(Continued)

(52) U.S. Cl.
CPC ............ *B60Q 1/32* (2013.01); *B60Q 1/0041* (2013.01); *F21S 41/285* (2018.01); *F21S 43/14* (2018.01); *F21S 43/195* (2018.01); *F21S 43/237* (2018.01); *F21S 43/239* (2018.01); *F21S 43/245* (2018.01); *F21S 43/249* (2018.01); *F21S 43/26* (2018.01); *F21S 43/27* (2018.01); *F21S 43/50* (2018.01); *F21W 2103/15* (2018.01)

(58) Field of Classification Search
CPC ....... B60Q 1/0041; B60Q 1/32; F21S 41/285; F21S 43/14; F21S 43/195; F21S 43/236; F21S 43/237; F21S 43/239; F21S 43/241; F21S 43/245; F21S 43/249; F21S 43/26; F21S 43/27; F21S 43/285; F21S 43/50; G02B 6/0073
See application file for complete search history.

(56) References Cited

U.S. PATENT DOCUMENTS

| | | | |
|---|---|---|---|
| 5,984,497 A | 11/1999 | Foerstner et al. | |
| 6,305,813 B1 * | 10/2001 | Lekson | B60Q 1/302 362/625 |

(Continued)

FOREIGN PATENT DOCUMENTS

| | | |
|---|---|---|
| WO | 9930192 A2 | 6/1999 |
| WO | 2013003366 A1 | 1/2013 |

OTHER PUBLICATIONS

English Machine Translation of WO9930192A2.

*Primary Examiner* — Leah Simone Macchiarolo
(74) *Attorney, Agent, or Firm* — David Coppiellie; King & Schickli, PLLC

(57) ABSTRACT

A sidemarker light assembly includes a support bracket, a light blade carried on the support bracket and a light source in communication with the first end of the light blade. Light from that light source is then transmitted through the light blade and emitted from a second end of the light blade to provide a sidemarker indication. A motor vehicle light assembly incorporating the sidemarker light assembly is also disclosed.

16 Claims, 5 Drawing Sheets

(51) Int. Cl.
  *F21S 43/50* (2018.01)
  *F21S 43/245* (2018.01)
  *F21S 43/249* (2018.01)
  *F21S 43/239* (2018.01)
  *B60Q 1/00* (2006.01)
  *F21S 43/27* (2018.01)
  *F21W 103/15* (2018.01)

(56) References Cited

U.S. PATENT DOCUMENTS

| | | | |
|---|---|---|---|
| 8,333,493 B2 | 12/2012 | Taleb-Bendiab et al. | |
| 8,840,289 B2 | 9/2014 | Lindsay et al. | |
| 10,066,802 B2* | 9/2018 | Hirata | F21S 41/00 |
| 2003/0086276 A1* | 5/2003 | Ohtsuka | B60Q 1/2607 |
| | | | 362/511 |
| 2003/0142935 A1* | 7/2003 | Tarne, I | F21S 43/239 |
| | | | 385/120 |
| 2004/0257790 A1* | 12/2004 | Tanaka | B60Q 1/26 |
| | | | 362/23.07 |
| 2009/0154186 A1* | 6/2009 | Natsume | B60Q 1/0041 |
| | | | 362/516 |
| 2010/0053986 A1* | 3/2010 | Ishikawa | B60Q 1/2665 |
| | | | 362/509 |
| 2010/0073954 A1 | 3/2010 | Gebauer | |
| 2010/0202153 A1* | 8/2010 | Schwab | B60Q 1/0041 |
| | | | 362/520 |
| 2010/0246200 A1* | 9/2010 | Tessnow | G02B 6/0075 |
| | | | 362/509 |
| 2011/0058385 A1* | 3/2011 | Kazaoka | B60R 1/1207 |
| | | | 362/540 |
| 2012/0113660 A1* | 5/2012 | Ishikawa | B60Q 1/0088 |
| | | | 362/494 |
| 2013/0130674 A1* | 5/2013 | De Wind | B60Q 1/2619 |
| | | | 455/420 |
| 2013/0314946 A1* | 11/2013 | Wilson | F21S 41/24 |
| | | | 362/612 |
| 2014/0140081 A1* | 5/2014 | Takahashi | B60Q 1/2665 |
| | | | 362/509 |
| 2014/0140084 A1* | 5/2014 | Zwick | B60Q 1/26 |
| | | | 362/511 |
| 2014/0160779 A1* | 6/2014 | Pusch | B60Q 1/2607 |
| | | | 362/511 |
| 2016/0025289 A1* | 1/2016 | Maruyama | G02B 6/0021 |
| | | | 362/511 |
| 2016/0076720 A1* | 3/2016 | Nantais | B60Q 1/0041 |
| | | | 362/511 |
| 2016/0356446 A1* | 12/2016 | Okada | G02B 6/001 |
| 2017/0023723 A1* | 1/2017 | Tanaka | G02B 6/0045 |
| 2017/0089541 A1* | 3/2017 | Nakajima | B60Q 1/22 |
| 2017/0122519 A1* | 5/2017 | Freiding | G02B 6/0036 |
| 2017/0267163 A1* | 9/2017 | Watanabe | F21S 43/40 |
| 2018/0210127 A1* | 7/2018 | Akiyama | G02B 6/001 |

* cited by examiner

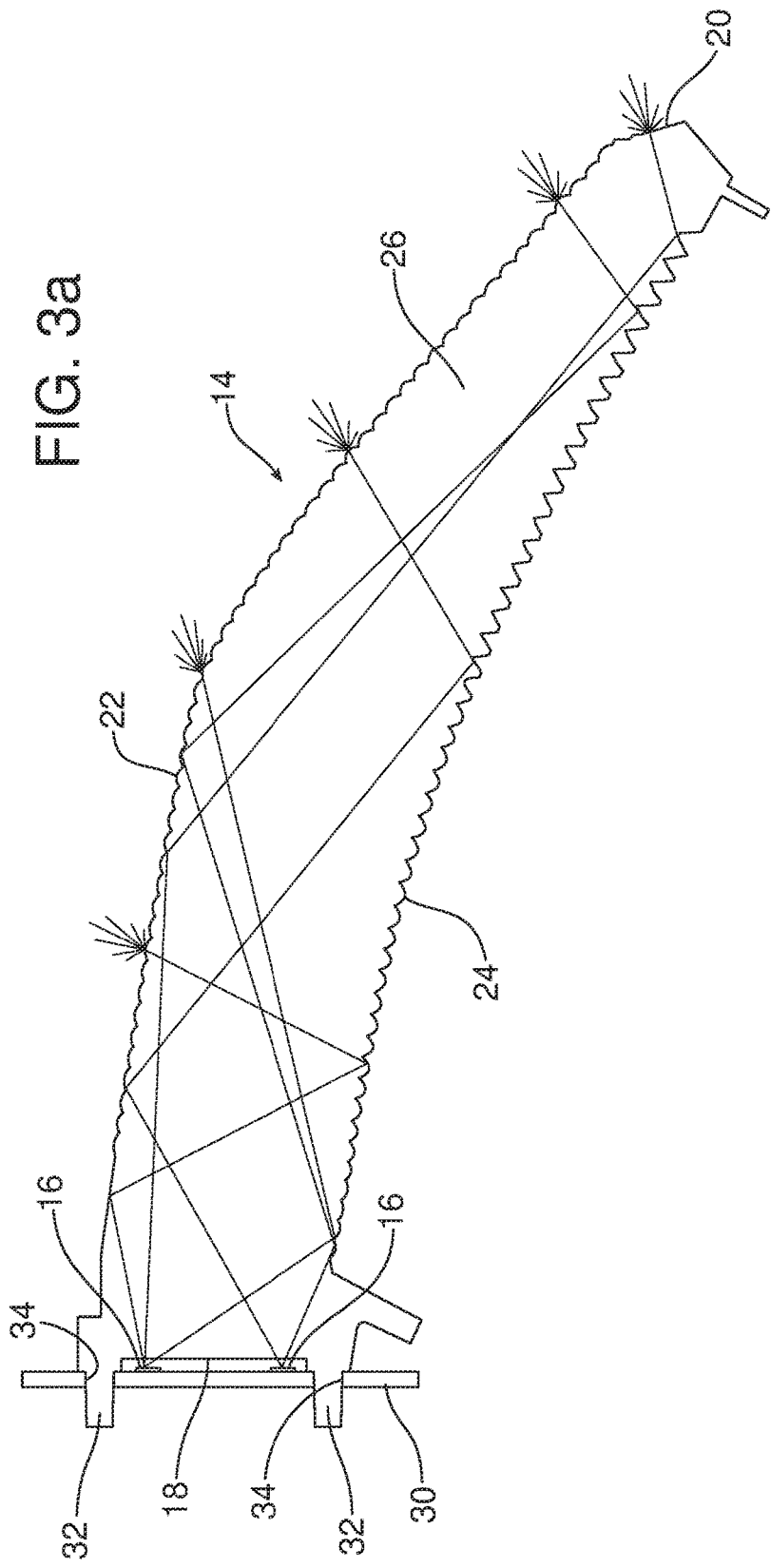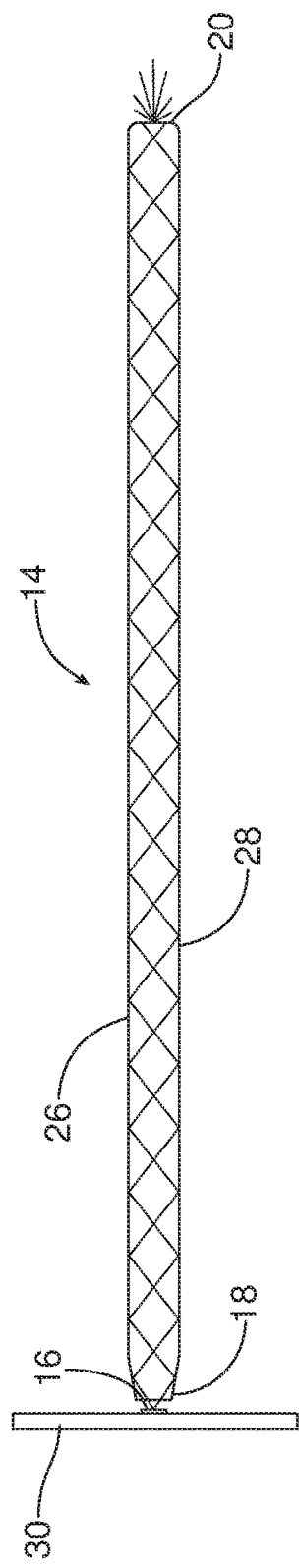

SIDEMARKER LIGHT ASSEMBLY AND MOTOR VEHICLE LIGHT ASSEMBLY INCORPORATING THAT SIDEMARKER LIGHT ASSEMBLY

TECHNICAL FIELD

This document relates generally to the motor vehicle equipment field and, more particularly, to a new and improved sidemarker light assembly as well as to a motor vehicle light assembly incorporating that sidemarker light assembly.

BACKGROUND

In order for a motor vehicle to meet regulatory requirements in some geographic areas including the Unites States of America, the motor vehicle must include provisions for what is known as a sidemarker identifier on the exterior sides of the motor vehicle both in the front and in the rear. More specifically, the sidemarker identifier is a visual identifier that originates from a luminous source. The sidemarker identifier must be visible from very prescriptive angles, must emit a certain minimum amount of light intensity and in many jurisdictions must be illuminated in a particular color.

This document relates to a new and improved sidemarker identifier in the form of a sidemarker light assembly which includes a light blade rather than a point source. The light blade includes a first end that collects light from a light source. That light is transmitted through the light blade to the second end which functions as the sidemarker identifier. A faceted front and rear faces of the light blade allows for the creation of a unique and aesthetically striking visual signature across a motor vehicle light assembly incorporating the sidemarker light assembly.

SUMMARY

In accordance with the purposes and benefits described herein, a sidemarker light assembly is provided. That sidemarker light assembly comprises a support bracket, a light blade carried on the support bracket and a light source. The light blade includes a first end and a second end. The light source is provided in communication with the first end. Light from the light source is transmitted through the light blade and emitted from the second end which functions as a sidemarker identifier.

The light source may be at least one light emitting diode. That at least one light emitting diode may be carried on an LED circuit board.

The first end of the light blade may include two mounting lugs and the LED circuit board may include two receivers for engaging those two mounting lugs. In some embodiments the two mounting lugs may be heat stakes.

The at least one light emitting diode may be positioned on the LED circuit board between the two receivers. This ensures that the at least one light emitting diode is properly aligned with the first end of the light blade to gather light emitted by the at least one light emitting diode.

The bracket may include a first leg and a second leg. The second leg may intersect the first leg at an intersection. The bracket may further include a channel extending along the second leg through the intersection. When assembled the light blade may be received and held in that channel. In some of the many possible embodiments the bracket is substantially T-shaped.

The light blade may include an arcuate faceted front face. The light blade may include an arcuate faceted rear face. The first end of the light blade may have a first cross-sectional area $A_1$ and the second end may have a second cross-sectional area $A_2$ where $A_1 > A_2$.

In accordance with an additional aspect, a motor vehicle light assembly is provided. That motor vehicle light assembly comprises a main headlight body, an inner bezel including a receiver, an outer lens and a sidemarker light assembly including a light blade positioned in the receiver.

More specifically, the inner bezel may include a turn signal light inner lens and the receiver may be positioned in the turn signal light inner lens. In some of the many possible embodiments the receiver may bisect the turn signal light inner lens.

The inner bezel may also include a first headlight inner lens and a second headlight inner lens. The turn signal inner lens may be provided between the first headlight inner lens and the second headlight inner lens. In some of the many possible embodiments, the first headlight inner lens, the turn signal inner lens and the second headlight inner lens are vertically aligned.

In the following description, there are shown and described several preferred embodiments of the sidemarker light assembly as well as of the motor vehicle light assembly incorporating that sidemarker light assembly. As it should be realized, the sidemarker light assembly and the motor vehicle light assembly are capable of other, different embodiments and their several details are capable of modification in various, obvious aspects all without departing from the sidemarker light assembly and motor vehicle light assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sidemarker light assembly and motor vehicle light assembly and together with the description serve to explain certain principles thereof. In the drawing figures:

FIG. 3a is a detailed top plan view of the light blade and light source of the sidemarker light assembly illustrated in FIGS. 1 and 2.

FIG. 3b is a cross section through the light blade illustrating how light emitted from the LED light source is collected at the first end of the light blade and transmitted along the light blade to the second end of the light blade which functions as a sidemarker identifier.

Reference will now be made in detail to the present preferred embodiments of the sidemarker light assembly and the motor vehicle light assembly, examples of which are illustrated in the accompanying drawing figures.

DETAILED DESCRIPTION

Figure 1:
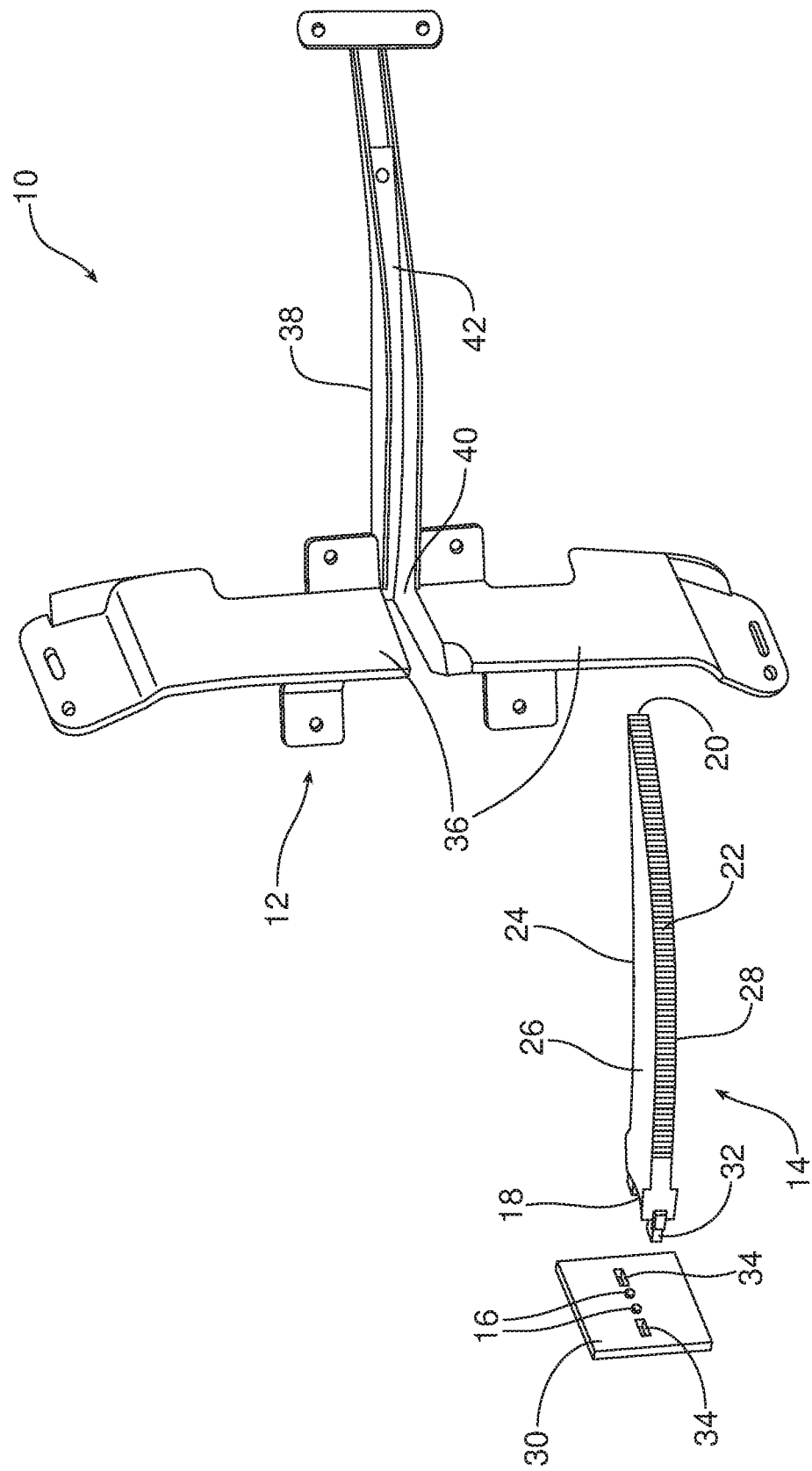
FIG. 1 is an exploded perspective view of the new and improved sidemarker light assembly.
Figure 2:
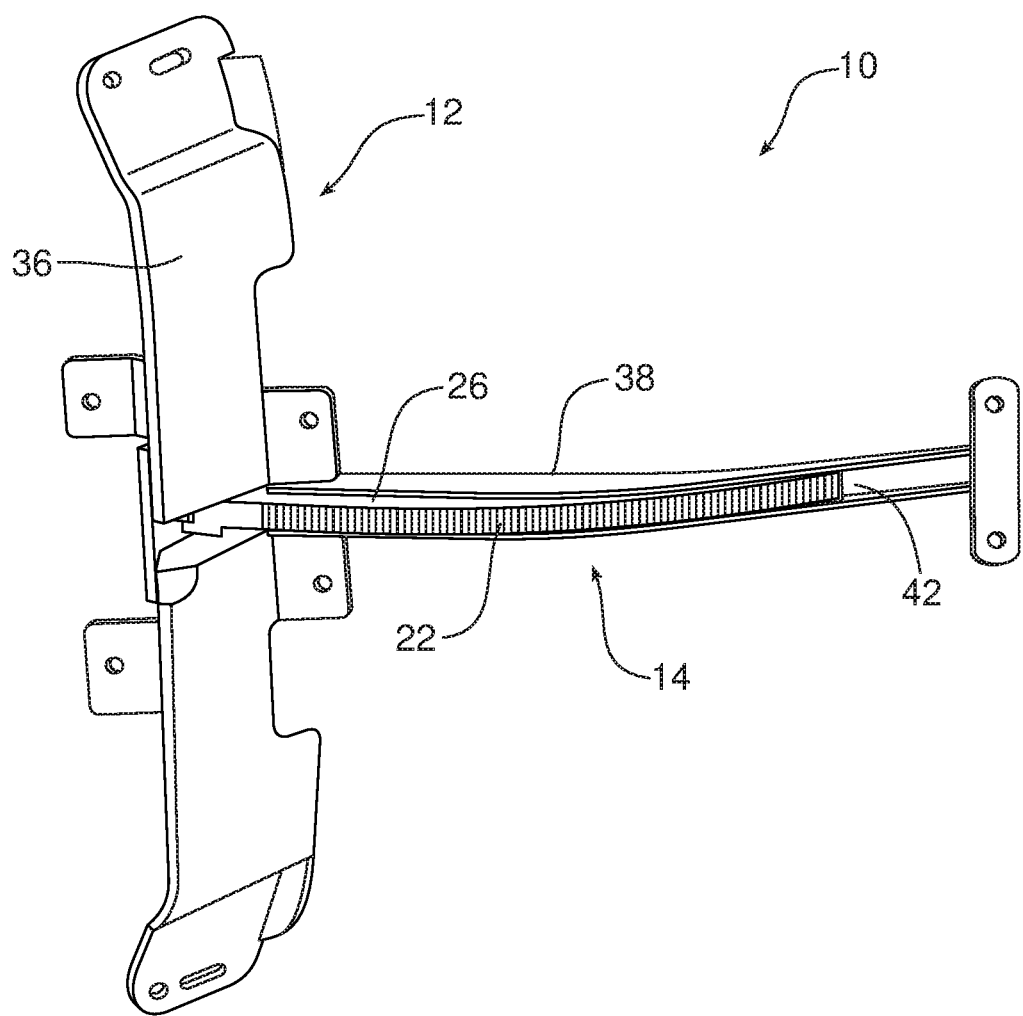
FIG. 2 is a perspective view of the sidemarker light assembly illustrated in FIG. 1 in the assembled configuration.

Reference is now made to FIGS. 1 and 2 illustrating the new and improved sidemarker light assembly 10. That sidemarker light assembly 10 includes a support bracket 12, a light blade 14 carried on the support bracket and a light source 16.

As illustrated in FIGS. 1, 2, 3a and 3b, the light blade 14 includes a first end 18, a second end 20, an arcuate, faceted front face 22, an arcuate, faceted rear face 24, a top face 26 and a bottom face 28. The light blade 14 may be made from substantially any appropriate material known in the art to be useful for light transmission including, but not necessarily limited to, acrylic, polycarbonate, glass and moldable silicone.

In the illustrated embodiment, the first end 18 of the light blade 14 has a first cross-sectional area $A_1$ and the second end 20 has a second cross-sectional area $A_2$ where $A_1 > A_2$. This serves to concentrate the light transmitted through the length of the light blade 14 from the first end 18 to the second end 20. FIGS. 3a and 3b include transmission lines illustrating the light traveling through the light blade 14 from the first end 18 to the second end 20. The facets in the faces 22 and 24 are shaped to control light transmission through the light blade 14 while only allowing a desired, limited amount to pass through the front face 22 for the desired lighting effect.

In the illustrated embodiment, the light source 16 comprises at least one light emitting diode (LED): two LEDs are illustrated. As illustrated in FIGS. 1, 2 and 3a, the light source 16 is provided in communication with the first end 18 of the light blade. Light emitted from the light source 16 is collected at the first end 18 of the light blade 14 and then transmitted through the light blade to the second end 20 where that light is emitted as a sidemarker identifier. In those jurisdictions requiring the sidemarker identifier to be of a particular color, the light source 16 may generate light in that color that is transmitted through a light blade 14 of clear material. In an alternative embodiment, the light source 16 may generate white light which is transmitted through a light blade 14 made of material of the desired color.

The two LEDs that form the light source 16 in the illustrated embodiment are carried on an LED circuit board 30. That LED circuit board 30 is mounted to the light blade 14. More particularly, the light blade 14 includes two mounting lugs 32 that project from the first end 18 of the light blade. In the illustrated embodiment, those mounting lugs 32 are heat stakes.

The LED circuit board 30 includes two receivers 34 in the form of apertures that are sized and spaced to receive and engage the two mounting lugs 32. In order to complete the connection, the mounting lugs 32 are aligned with the receivers 34 and then inserted and fully seated in the receivers. The heat stakes/mounting lugs 32 are then subjected to heat in order to complete the connection.

As should be appreciated, the two LEDs that form the light source 16 are positioned on the LED circuit board 30 between the two receivers 34 so that when the light blade 14 is secured to the LED circuit board 30, the two LEDs are positioned juxtaposed to the first end 18 of the light blade 14. This configuration ensures the best possible light collection and transmission by the light blade 14.

The support bracket 12 includes a first leg 36 and a second leg 38. The second leg 38 intersects the first leg 36 at an intersection 40. In the illustrated embodiment, the bracket 12 is substantially T-shaped. As best illustrated in FIGS. 1 and 2, the bracket 12 also includes a channel 42. That channel 42 extends along the second leg 38 through the intersection 40 partially bisecting the first leg 36. When the sidemarker light assembly 10 is properly assembled, the light blade 14 is received and held in the channel 42 of the bracket 12.

Figure 4:
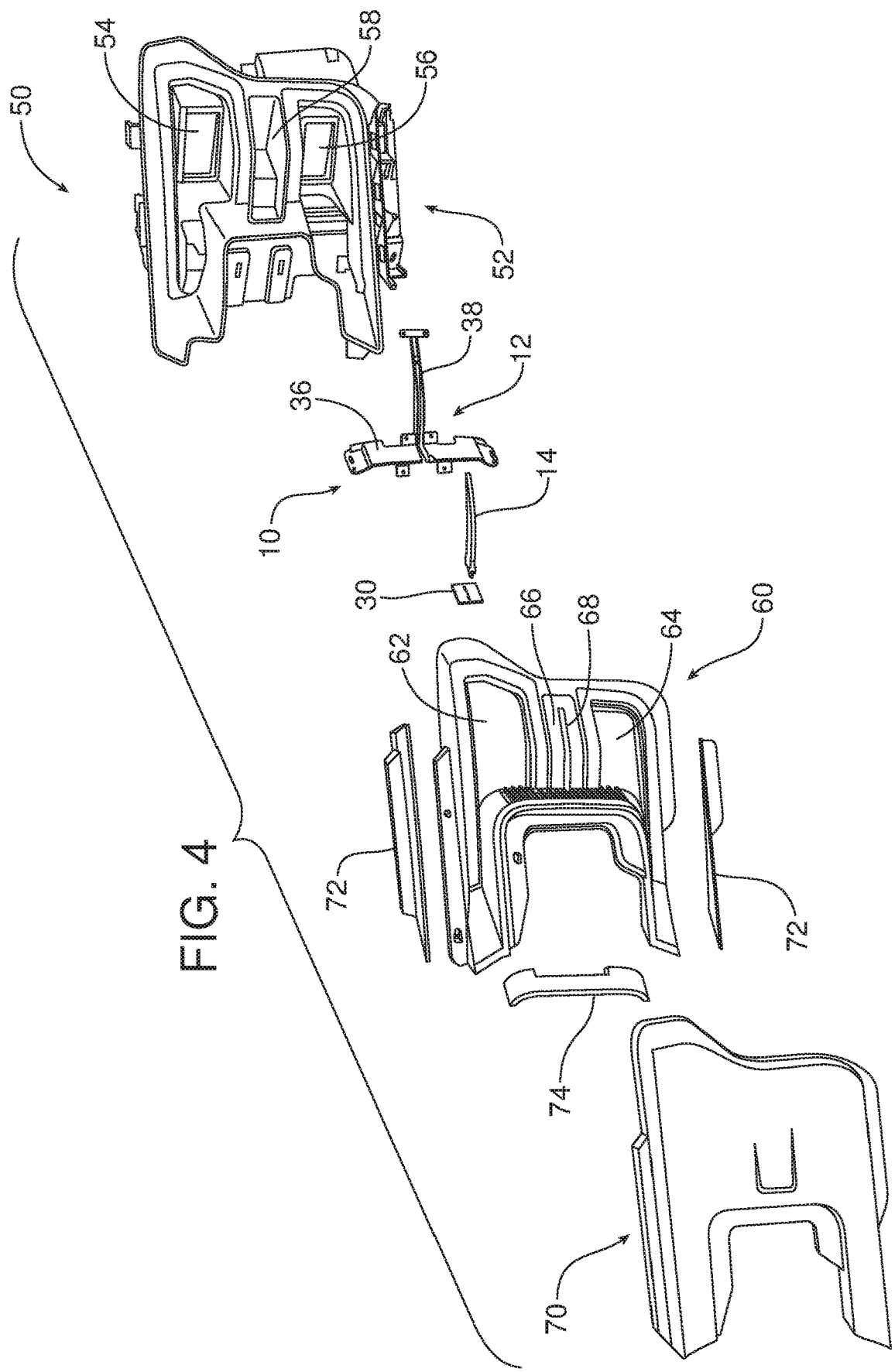
FIG. 4 is an exploded perspective view of a motor vehicle light assembly incorporating the new and improved sidemarker light assembly illustrated in FIGS. 1-3b.
Figure 5:
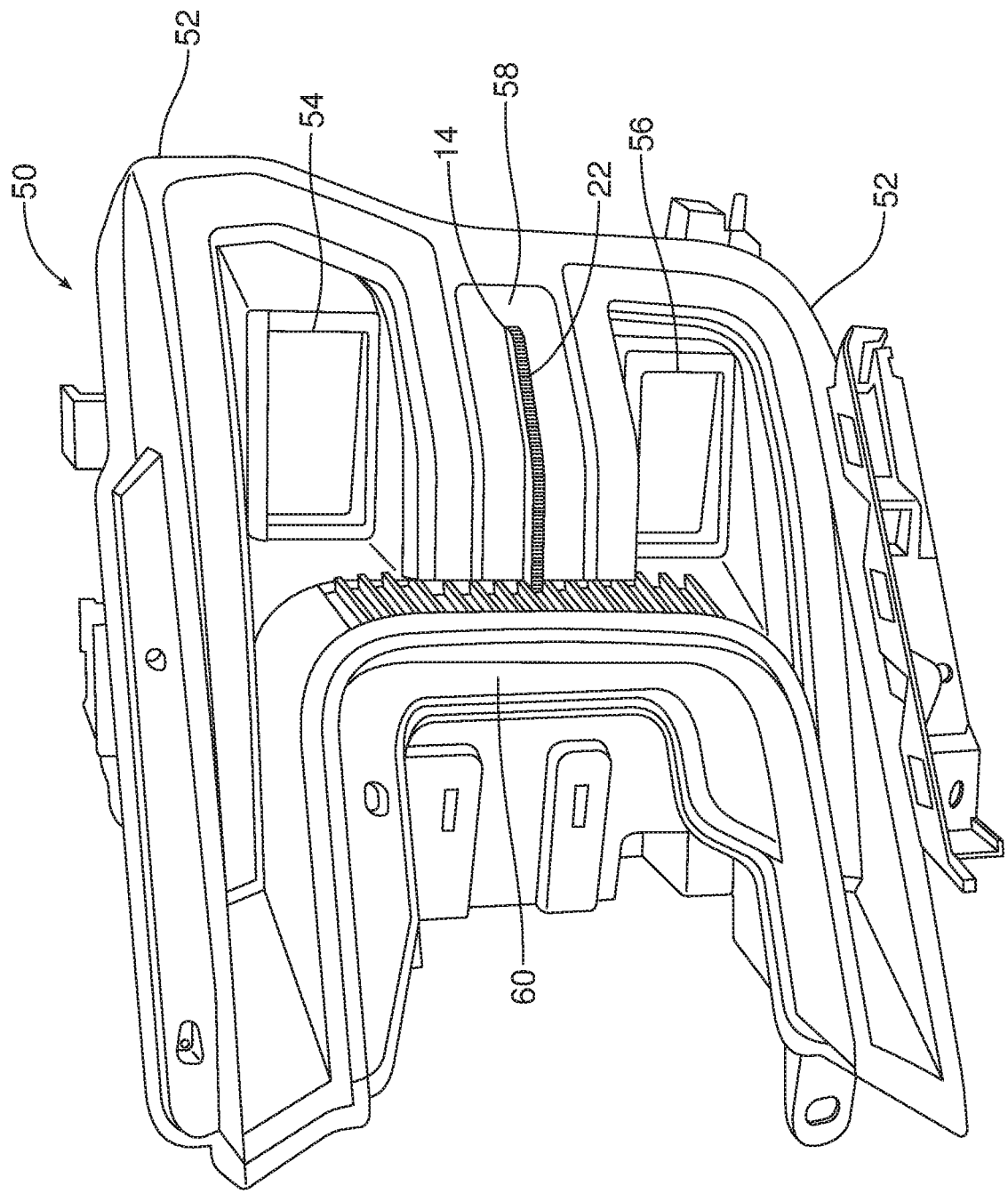
FIG. 5 is a perspective view of the motor vehicle light assembly illustrated in FIG. 4 but in the assembled configuration.

Reference is now made to FIGS. 4 and 5 illustrating a new and improved motor vehicle light assembly 50. The motor vehicle light assembly 50 includes a main headlight body 52 including a first headlight source 54, a second headlight source 56 and a turn signal light source 58. One of the first headlight source 54 and second headlight source 56 is a low beam headlamp while the other of the first headlight source 54 and second headlight source 56 is a high beam headlamp. In the illustrated embodiment, the first headlight source 54, second headlight source 56 and turn signal light source 58 are stacked in a vertical orientation with the turn signal light source between the first headlight source and the second headlight source.

The motor vehicle light assembly 50 also includes an inner bezel 60 including a first headlight opening 62, a second headlight opening 64 and a turn signal light inner lens 66. In the illustrated embodiment, the first headlight opening 62, second headlight opening 64 and turn signal light inner lens 66 are provided in a vertically aligned configuration with the turn signal light inner lens between the first headlight opening and the second headlight opening so as to correspond to the spacing and configuration of the first headlight source 54, second headlight source 56 and turn signal light source 58 on the main headlight body 52. As illustrated, the inner bezel 60 includes a receiver 68 in the form of a slot that bisects the turn signal light inner lens 66.

The motor vehicle light assembly 50 also includes an outer lens 70 that overlies the inner bezel.

The motor vehicle light assembly 50 also includes the sidemarker light assembly 10 previously described in detail and illustrated in detail in FIGS. 1, 2, 3a and 3b. When fully assembled, the first leg 36 of the sidemarker light assembly 10 is secured by appropriate fasteners to the rear face of the inner bezel 60 with the light blade 14 positioned in and extending through the receiver 68. In this positioned, the arcuate faceted front face 22 of the light blade 14 is visible from the front of the motor vehicle light assembly 50 and effectively bisects the turn signal inner lens 66. As should be further appreciated, the inner bezel 60 is packaged between the outer lens 70 and the main headlight body 52. The closeout panel 72 and reflex plate 74 complete the motor vehicle light assembly 50 which is illustrated in the assembled configuration in FIG. 5.

As should be appreciated from reviewing FIG. 5, the arcuate faceted front face 22 of the light blade 14 emits light that bisects the turn signal light inner lens 66 to provide a unique geometry and desirable visual signature resulting in a new and refreshing appearance. This is true in the lit or unlit state. The light blade 14 also meets its functional requirements for lit area, location and intensity, effectively providing the desired sidemarker indicator at the second end 20 of the light blade 14. Therefore, it should be appreciated that the sidemarker light assembly 10 and the motor vehicle light assembly 50 incorporating that sidemarker light assembly both represent novel structures that significantly advance the art.

The foregoing has been presented for purposes of illustration and description. It is not intended to be exhaustive or to limit the embodiments to the precise form disclosed. Obvious modifications and variations are possible in light of the above teachings. For example, in the embodiment of the motor vehicle light assembly 50 illustrated in the drawing Figures, there are two headlamps: one for high beam and one for low beam. The motor vehicle light assembly 50 could simply include a single headlamp for high and low beam if desired. Further, the light blade 14 in the illustrated embodiment bisects the turn signal light inner lens 66 to provide a distinctive aesthetic appearance. It should be appreciated that the light blade 14 could be provided at a different position and the motor vehicle light assembly 50 could assume a different overall configuration. All such modifications and variations are within the scope of the appended claims when interpreted in accordance with the breadth to which they are fairly, legally and equitably entitled.

What is claimed:

1. A sidemarker light assembly, comprising:
   a support bracket including a channel;
   a light blade received in said channel of said support bracket, said light blade including a first end, a second end, a top face, a bottom face, an arcuate, faceted front face and an arcuate, faceted rear face opposite said arcuate, faceted front face; and
   a light source in communication with said first end whereby light from said light source is transmitted through said light blade and emitted from said second end.

2. The sidemarker light assembly of claim 1, wherein said light source is at least one light emitting diode.

3. The sidemarker light assembly of claim 2, wherein said at least one light emitting diode is carried on an LED circuit board.

4. The sidemarker light assembly of claim 3, wherein said first end includes two mounting lugs and said LED circuit board includes two receivers engaging said two mounting lugs.

5. The sidemarker light assembly of claim 4, wherein said at least one light emitting diode is positioned on said LED circuit board between said two receivers.

6. The sidemarker light assembly of claim 5, wherein said bracket includes a first leg and a second leg wherein said second leg intersects said first leg at an intersection.

7. The sidemarker light assembly of claim 6, wherein said channel extends along said second leg through said intersection.

8. The sidemarker light assembly of claim 7, wherein said light blade is received and held in said channel.

9. The sidemarker light assembly of claim 8, wherein said support bracket is substantially T-shaped.

10. The sidemarker light assembly of claim 9, wherein said first end has a first cross-sectional area $A_1$ and said second end has a second cross-sectional area $A_2$ where $A_1 > A_2$.

11. The sidemarker light assembly of claim 1, wherein said support bracket includes a first leg and a second leg wherein said second leg intersects said first leg at an intersection.

12. The sidemarker light assembly of claim 11, wherein said channel extends along said second leg through said intersection and said light blade is received and held in said channel.

13. A motor vehicle light assembly, comprising:
    a main headlight body;
    an inner bezel including an integral receiver;
    an outer lens wherein said inner bezel is packaged between said main headlight body and said outer lens; and
    a sidemarker light assembly including a light blade positioned in said receiver.

14. The motor vehicle light assembly of claim 13, wherein said inner bezel includes a turn signal light inner lens and said receiver is provided in said turn signal light inner lens.

15. The motor vehicle light assembly of claim 14, wherein said inner bezel includes a first headlight inner lens and a second headlight inner lens and said turn signal light inner lens is provided between said first headlight inner lens and said second headlight inner lens.

16. The motor vehicle light assembly of claim 15, wherein said first headlight inner lens, said turn signal light inner lens and said second headlight inner lens are vertically aligned.

* * * * *